US006789779B2

(12) United States Patent
Wilde et al.

(10) Patent No.: US 6,789,779 B2
(45) Date of Patent: Sep. 14, 2004

(54) MAGNET VALVE, IN PARTICULAR FOR A TRACTION-CONTROLLED HYDRAULIC VEHICLE BRAKE SYSTEM

(75) Inventors: Werner Wilde, Schwieberdingen (DE); Friedrich Megerle, Asperg (DE); Dieter Kawa, Erdmannhausen (DE); Ulrich Sickinger, Gerlingen (DE); Harald Speer, Freiberg (DE); Siegfried Fritsch, Sonthofen (DE); Rainer Menzenbach, Immenstadt (DE); Guenther Schnalzger, Blaichach (DE); Andreas Reize, Stuttgart (DE); Robert Stoehr, Horneburg (DE); Jochen Reinhold, Bruchsal (DE); Thomas Butz, Korntal-Muenchingen (DE); Johann Herr, Vaihingen (DE); Ulrich Pechthold, Schwieberdingen (DE); Christian Laier, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,216
(22) PCT Filed: Jul. 14, 2001
(86) PCT No.: PCT/DE01/02637
§ 371 (c)(1), (2), (4) Date: Sep. 26, 2003
(87) PCT Pub. No.: WO02/12039
PCT Pub. Date: Feb. 14, 2002

(65) Prior Publication Data
US 2004/0089832 A1 May 13, 2004

(30) Foreign Application Priority Data
Aug. 4, 2000 (DE) .......................................... 100 38 091

(51) Int. Cl.⁷ ............................. F16K 31/02; B60T 8/36
(52) U.S. Cl. ................... 251/129.15; 251/318; 251/333
(58) Field of Search .......................... 251/65, 318–334, 251/129.01–129.22

(56) References Cited

U.S. PATENT DOCUMENTS

| 5,542,755 A | * | 8/1996 | Staib et al. ............... 303/119.2 |
| 6,382,532 B1 | * | 5/2002 | French et al. ............ 239/585.1 |
| 6,644,623 B1 | * | 11/2003 | Voss et al. ............. 251/129.15 |
| 6,659,421 B1 | * | 12/2003 | Goossens ............... 251/129.02 |

FOREIGN PATENT DOCUMENTS

| DE | 197 10 353 A | 9/1998 |
| DE | 198 07 130 A | 8/1999 |

OTHER PUBLICATIONS

Patent Abstracts of Japan, vol. 1998, No. 08, Jun. 30, 1998; & JP 10 082478 A (Aisin Seiki Co. Ltd.); Mar. 31, 1998; Zusammenfassung; Abbildung 3.
Patent Abstracts of Japan, vol. 1999, No. 08; Jun. 30, 1999; & JP 11 063281 A (Unisia Jecs Corp.); Mar. 5, 1999; Zusammenfassung; Abbildung.

* cited by examiner

Primary Examiner—Paul J. Hirsch
(74) Attorney, Agent, or Firm—Ronald E. Greigg

(57) ABSTRACT

A hydraulic part of a magnet valve is received in a bore of a valve block. The hydraulic part is secured to the valve block with a calked heel of a securing bush that is slipped onto a guide sleeve of the hydraulic part. The securing bush rests on an annular shoulder of the guide sleeve and engages a jacket wall of the guide sleeve with a press fit, and one edge of the securing bush is adapted to a rounded-out throat between the jacket wall and an end wall of the annular shoulder by means of plastic deformation. A valve sleeve engages a portion of the bore of the valve block with a press fit. The calked heel, the plastically deformed edge of the securing bush, and the press fit of the valve bush seals that seal off against fluid are achieved without using additional rubber-elastic sealing means.

14 Claims, 1 Drawing Sheet

MAGNET VALVE, IN PARTICULAR FOR A TRACTION-CONTROLLED HYDRAULIC VEHICLE BRAKE SYSTEM

CROSS-REFERENCE TO RELATED APPLICATIONS

This application is a 35 USC 371 application of PCT/DE 01/02637 filed on Jul. 14, 2001.

BACKGROUND OF THE INVENTION

1. Field of the Invention

The invention is directed to an improved magnet valve for use in a traction-controlled hydraulic brake system for a vehicle.

2. Description of the Prior Art

One magnet valve is already known (German Patent Disclosure DE 198 07 130 A1), in which a hydraulic part of the magnet valve is received in a bore of a valve block. An electrical part of the magnet valve is slipped onto the hydraulic part, the latter protruding from the valve block.

The hydraulic part of the known magnet valve has an armature guide sleeve, which toward the valve block is widened with an annular shoulder, for the fluid-tight reception of a multi-part valve body with a valve seat of a seat valve. A securing bush is slipped onto the armature guide sleeve. This securing bush fittingly embraces the armature guide sleeve above the annular shoulder and also embraces both the annular shoulder itself and a following, widened sleeve portion, in the case of these latter two doing so with a fluid-tight press fit. The securing bush is also calked to the armature guide sleeve in the region of the orifice of this guide sleeve, which entails increased assembly effort and expense. The hydraulic part, which is completed with an armature, a restoring spring, a pole core and a filter disk, is braced with the securing bush on a step in the bore of the valve block. Calking the securing bush on the outer circumference on the valve block serves to secure and seal off the hydraulic part in the fluid-carrying bore.

SUMMARY OF THE INVENTION

It is also known from German Patent Disclosure DE 197 10 353 A1 to equip the hydraulic part of a magnet valve with a cup-shaped valve sleeve, which on its bottom is provide with a valve seat of a seat vavle, which valve seat is created without metal-cutting machining. The vavle sleeve engages a portion of the bore of a valve block with a circumferential press fit in fluid-tight fashion and separates fluid-carrying conduits whose passage can be switched with the seat valve. This makes it possible to dispense with an additional sealing element.

The magnet valve of the invention has the advantage over the first valve described above in that a fluid-tight communication between the guide sleeve and the securing bush is achieved simultaneously with the slipping of the bush onto the sleeve to generate the press fit, and that the edge of the securing bush, on striking the throat of the guide sleeve, undergoes a reshaping process that leads to an intimate conforming of the guide sleeve and the securing bush in this zone. In this pressure-reshaping, the throat is the tool, and the edge is the plastically deformed workpiece. By means of this design, it is economically possible in a single assembly operation both to secure the bush on the guide sleeve and to provide sealing between the two parts.

BRIEF DESCRIPTION OF THE DRAWINGS

One exemplary embodiment of the invention is explained in further detail herein below, with reference to the drawings, in which.

DESCRIPTION OF THE PREFERRED EMBODIMENT

Figure 1:
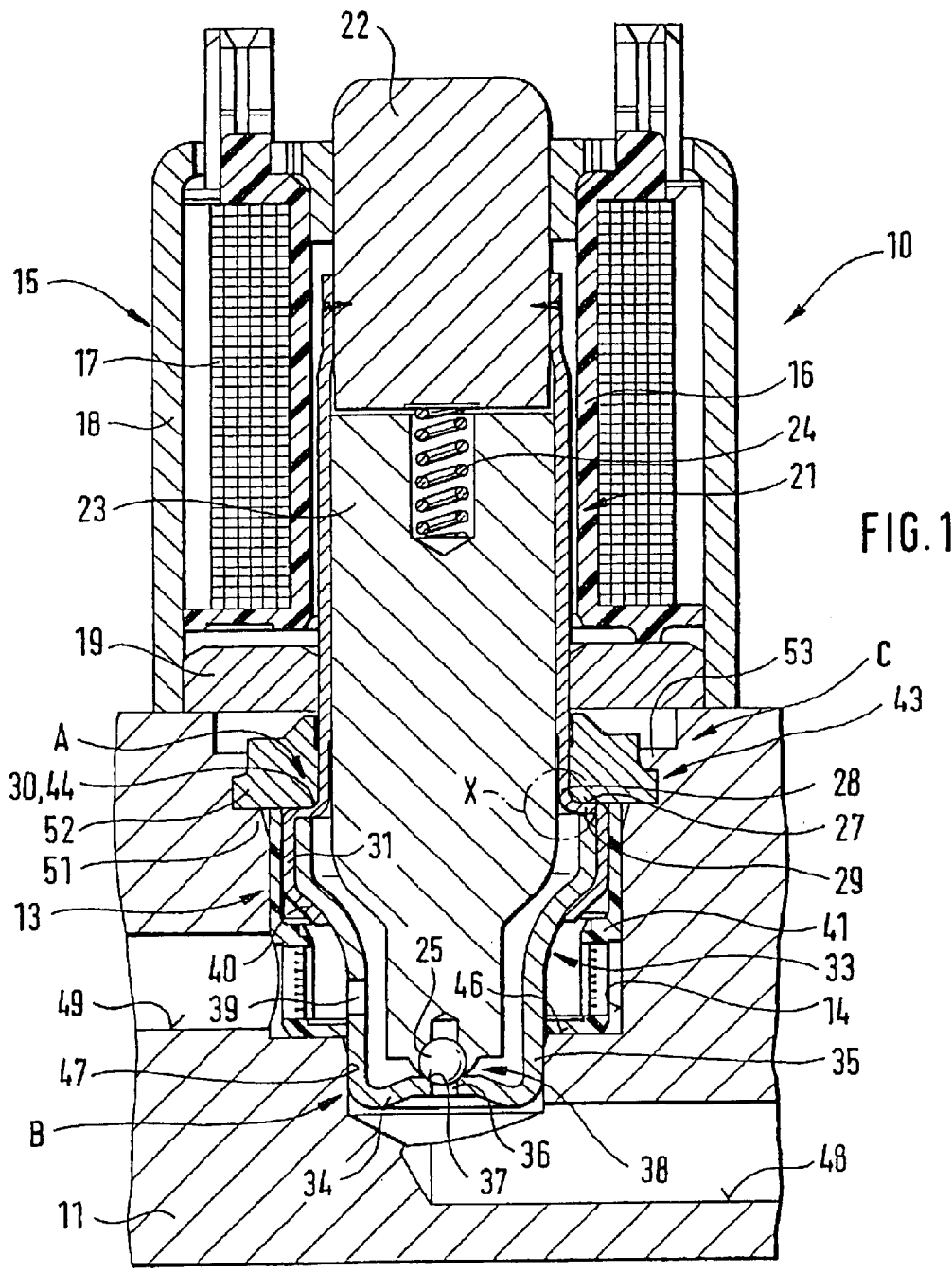
FIG. 1 is a longitudinal section through a magnet valve, disposed on a valve block.

A magnet valve 10 shown in FIG. 1 of the drawing is disposed on a valve block 11 and forms part of a pressure control device, not otherwise shown, for hydraulic vehicle brake systems.

The magnet valve 10, which is closed when without current, comprises two component groups: a hydraulic part 13, which is received partly in a stepped bore 14 of the valve block 11, and an electrical part 15, which is slipped onto the hydraulic part that protrudes from the valve block. The electrical part 15 essentially comprises a coil body 16 with an electrical winding 17, a coil jacket 18 that carries magnetic flux, and an annular disk 19 that carries magnetic flux.

The hydraulic part 13 of the magnet valve 10 has a guide sleeve 21, which on its end toward the electrical part 15 is closed with a pole core 22 that is press-fitted in and is welded to be fluid-tight. A longitudinally displaceable armature 23 is received in the guide sleeve 21. The armature 23 is braced with a restoring spring 24 on the pole core 22. Remote from the pole core, the armature 23 is provided with a ball-shaped closing member 25.

Figure 2:
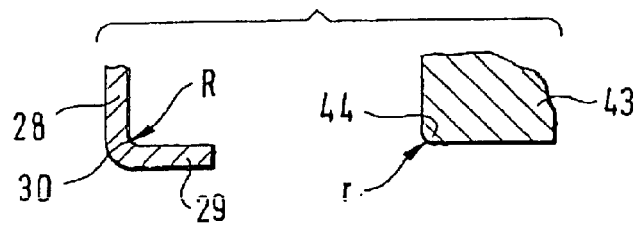
FIG. 2 shows the portions, marked as detail X in FIG. 1, of components, which are shown both separately and in the state of preassembly.

The guide sleeve 21 is widened with an annular shoulder 27, which has an end wall 29 originating radially at a cylindrical jacket wall 28 of the guide sleeve. In the transition region between the jacket wall 28 and the end wall 29, the guide sleeve 21 is provided with a rounded-out throat 30, which has a rounded inside-corner radius R (FIG. 2). Remote from the pole core, the guide sleeve 21 has a hollow-cylindrical portion 31 of larger diameter that follows the annular shoulder 27.

A cup-shaped valve sleeve 33 is press-fitted into the hollow-cylindrical portion 31 of the guide sleeve 21, from the side remote from the pole core. The valve sleeve 33, embodied as a deep-drawn part, tapers toward its bottom to form a straight cylindrical jacket portion 35. On the bottom 34 are both a passage 36 and a hollow-conical valve seat 37, which is engaged by the closing body 25 of the armature 23 in the position shown of the magnet valve 10. The closing member 25 and the valve seat 37 form a seat valve 38, with which a fluid-carrying communication between the passage 36 in the bottom and a passage 39 in the jacket portion 35 of the valve sleeve 33 can be switched. The valve sleeve 33 is secured to the guide sleeve 21 by a crimped connection 40 created on the free end of the hollow-cylindrical portion 31. A filter sleeve 41 is also slipped onto the hollow-cylindrical portion 31 of the guide sleeve 21 and fits over the passage 39 in the jacket of the valve sleeve 33.

The hydraulic part 13 of the magnet valve 10 also includes an annular securing bush 43. This securing bush is slipped onto the guide sleeve 21 from the side of the pole core 22. The securing bush 43 has an encompassing edge 44, associated with the throat 30 of the guide sleeve 21, that is manufactured with a rounded outer-corner radius r that is smaller than the rounded inside-corner radius R of the throat (FIG. 2). In the assembled state (as shown in FIG. 1), the securing bush 43 conforms fittingly to the jacket wall 28 and to the end wall 29 of the guide sleeve 21. The securing bush 43 engages the jacket wall 28 of the guide sleeve 21 with a press fit. When the edge 44 of the securing bush 43 strikes the throat 30 of the guide sleeve 21, an adaptation of the rounded outer-corner radius of the edge to the rounded inside-corner radius of the throat is also effected by plastic deformation of the edge 44. This is on the condition of adequate ductility of the securing bush 43 and adequate design strength of the guide sleeve 21. Both the press fit of the securing bush 43 on the jacket wall 28 and the plastically deformed edge 44 represent a seal, which is marked A in FIG. 1.

The hydraulic part 13 of the magnet valve 10, joined together from the aforementioned components (although in a different order from that described) is a component group that is mounted in the bore 14 of the valve block 11 as follows:

The hydraulic part 13 is introduced with its portion remote from the pole core into the bore 14. The jacket portion 35 of the valve sleeve 33, creating a press fit, engages a portion 47 of the bore 14 that follows a bore step 46. This is on the condition of sufficient dimensional rigidity of the valve sleeve 33, which is made with a greater wall thickness than the wall thickness of the guide sleeve 21 and is subjected to a heat treatment. With the press fit, a seal B is attained between the valve sleeve 33 and the bore portion 47 and separates fluid-carrying conduits 48 and 49 of the valve block 11. The operation of press-fitting the hydraulic part 13 into the bore 14 is defined by the impact of the securing bush 43 with an annular step 51, toward the orifice, of the bore 14. In this position of the hydraulic part 13, the filter sleeve 41, which extends as far as the securing bush 43, engages the bore step 46. By positive displacement of material comprising the valve block 11 from the edge of the orifice of the bore 14, a calked heel 53 that fits over a shoulder 52 of the securing bush 43 is created. This creates a seal C between the securing bush 43 and the valve block 11. In this way, the hydraulic part 13 of the magnet valve 10 is protected, without the use of rubber-elastic sealing means, against both the escape of fluid from the bore 14 of the valve block 11 and circumvention of the valve 38.

Finally, the magnet valve 10 is completed by slipping the electrical part 15 onto the portion of the hydraulic part 13 that protrudes from the valve block 11.

The foregoing relates to preferred exemplary embodiments of the invention, it being understood that other variants and embodiments thereof are possible within the spirit and scope of the invention, the latter being defined by the appended claims.

We claim:

1. A hydraulic vehicle brake system magnet valve (10) disposed in a valve block (11), the valve (10) comprising:
   a guide sleeve (21) for an armature (23);
   the guide sleeve (21) being widened with an annular shoulder (27), which has an end wall (29) originating at least approximately radially at a cylindrical jacket wall (28) of the guide sleeve (21);
   a securing bush (43) conforming fittingly to the jacket wall (28) of the guide sleeve (21) and slipped onto the guide sleeve (21) to the end wall (29) of the annular shoulder (27), and to a rounded-out throat (30) between the jacket wall (28) and the end wall (29);
   the guide sleeve (21) and the securing bush (43) being received in a bore (14) of the valve block (11), and the securing bush (43) being inserted into a step (51) of the bore (14);
   the securing bush (43) communicating with the valve block (11) through a fluid-tight calked heel (53);
   the securing bush (43) being guided with a press fit on the jacket wall (28) of the guide sleeve (21);
   an encompassing edge (44) on the securing bush (43) associated with the throat (30) of the guide sleeve (21), the edge (44) having a rounded outer-corner radius (r) that is smaller than a rounded inside-corner radius (R) of the throat (30);
   the rounded outer-corner radius (r) of the edge (44) being adapted, by plastic deformation of the edge (44) of the throat (30), at least approximately to the rounded inside-corner radius (R) of the throat when the securing bush (43) has been mounted on the guide sleeve (21); and
   a cup-shaped valve sleeve (33) secured in a hollow-cylindrical portion (31) of the guide sleeve (21), which portion (31) follows the annular shoulder (27);
   the valve sleeve (33) being embodied as a deep-drawn component with a valve seat (36) integrated with its bottom.

2. The magnet valve of claim 1, further comprising the cup-shaped valve sleeve (33) press-fitted into a hollow-cylindrical portion (31), following the annular shoulder (27), of the guide sleeve (21) and being secured to it by a crimped connection (40).

3. The magnet valve of claim 2, wherein the valve sleeve (33) is embodied with a wall thickness that is greater than the wall thickness of the guide sleeve (21).

4. The magnet valve of claim 1, wherein the valve sleeve (33) has one fluid-carrying passage (39, 36) each on both its jacket side and its bottom, of which the passage (36) on the bottom opens into a valve seat (37), produced by stamping, of a seat valve (38) that can be switched by the armature (23).

5. The magnet valve of claim 2, wherein the valve sleeve (33) has one fluid-carrying passage (39, 36) each on both its jacket side and its bottom, of which the passage (36) on the bottom opens into a valve seat (37), produced by stamping, of a seat valve (38) that can be switched by the armature (23).

6. The magnet valve of claim 3, wherein the valve sleeve (33) has one fluid-carrying passage (39, 36) each on both its jacket side and its bottom, of which the passage (36) on the bottom opens into a valve seat (37), produced by stamping, of a seat valve (38) that can be switched by the armature (23).

7. The magnet valve of claim 1, wherein the valve sleeve (33), with a jacket portion (35) located between the two passages (36, 39), is received with a press fit in fluid-tight fashion in a portion (47) of the bore (14) of the valve block (11) that follows a bore step (46).

8. The magnet valve of claim 4, wherein the valve sleeve (33), with a jacket portion (35) located between the two passages (36, 39), is received with a press fit in fluid-tight fashion in a portion (47) of the bore (14) of the valve block (11) that follows a bore step (46).

9. The magnet valve of claim 5, wherein the valve sleeve (33), with a jacket portion (35) located between the two passages (36, 39), is received with a press fit in fluid-tight fashion in a portion (47) of the bore (14) of the valve block (11) that follows a bore step (46).

10. The magnet valve of claim 6, wherein the valve sleeve (33), with a jacket portion (35) located between the two passages (36, 39), is received with a press fit in fluid-fight fashion in a portion (47) of the bore (14) of the valve block (11) that follows a bore step (46).

11. The magnet valve of claim 7, further comprising a filter sleeve (41) slipped onto the portion (31) of the guide sleeve (21), which filter sleeve extends between the securing bush (43) and the bore step (46) and fits over the passage (39) on the jacket of the valve sleeve (33).

12. The magnet valve of claim 8, further comprising a filter sleeve (41) slipped onto the portion (31) of the guide sleeve (21), which filter sleeve extends between the securing bush (43) and the bore step (46) and fits over the passage (39) on the jacket of the valve sleeve (33).

13. The magnet valve of claim 9, further comprising a filter sleeve (41) slipped onto the portion (31) of the guide sleeve (21), which filter sleeve extends between the securing bush (43) and the bore step (46) and fits over the passage (39) on the jacket of the valve sleeve (33).

14. The magnet valve of claim 10, further comprising a filter sleeve (41) slipped onto the portion (31) of the guide sleeve (21), which filter sleeve extends between the securing bush (43) and the bore step (46) and fits over the passage (39) on the jacket of the valve sleeve (33).

* * * * *